Figure 1:
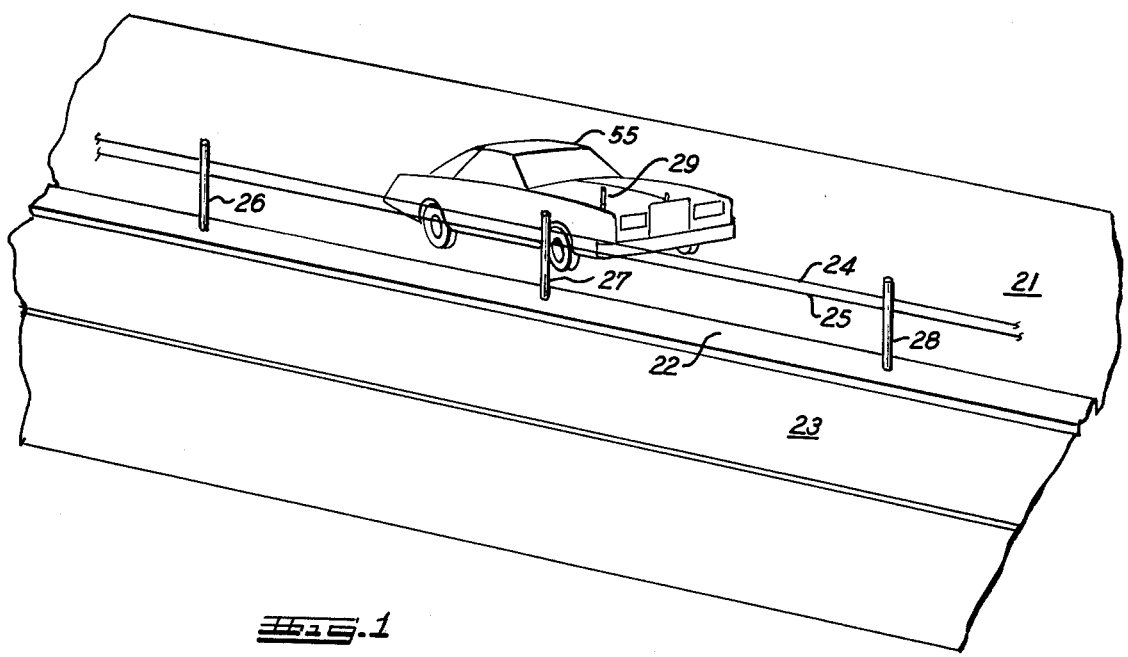

United States Patent [19]

Parke

[11] 4,097,808

[45] Jun. 27, 1978

[54] ENTERTAINMENT SYSTEM AND METHOD

[75] Inventor: Harry George Parke, Brooklyn, N.Y.

[73] Assignee: Marine Electric Corporation, Brooklyn, N.Y.

[21] Appl. No.: 672,950

[22] Filed: Apr. 2, 1976

[51] Int. Cl.² .............................................. H04B 7/00
[52] U.S. Cl. ...................................... 325/51; 325/178
[58] Field of Search ...................... 325/26, 51, 53, 54, 325/128, 129, 28, 178; 179/82; 340/32, 33, 22; 343/719, 848, 849; 246/7, 8; 180/98

[56] References Cited

U.S. PATENT DOCUMENTS

| 2,201,472 | 5/1940 | Browder et al. | 343/849 |
| 2,478,133 | 8/1949 | Shanklin | 343/719 |
| 2,499,180 | 2/1950 | Bossart | 246/8 |
| 2,980,793 | 4/1961 | Daniel | 179/82 |
| 3,423,681 | 1/1969 | McKenna | 325/129 |
| 3,470,474 | 9/1969 | Rohrer | 325/51 |
| 3,609,247 | 9/1971 | Halstead | 325/51 |
| 3,673,497 | 6/1972 | Thrasher | 179/82 |
| 3,766,476 | 10/1973 | Silitch | 325/51 |

FOREIGN PATENT DOCUMENTS 671,188   4/1952   Australia ................................ 179/82

Primary Examiner—Robert L. Griffin
Assistant Examiner—Mace E. Bookbinder
Attorney, Agent, or Firm—James L. Bean

[57] ABSTRACT

A system and method for providing entertainment and/or information to vehicles travelling along a roadway. The system of the invention enables the driver to tune his car radio to a single station while travelling on a specific long-distance road, and to receive high quality and continuous radio reception for the duration of his trip on the road. An antenna comprised of at least one conductor is strung adjacent to the roadway and parallel thereto, and is excited with an amplitude modulated radio frequency signal within 550 to 1650 khz broadcast band so that each vertical slice through the antenna is effective as an electrical multipole. The antenna excitation signal is arranged to be large enough so that the vehicles on the roadway, which are substantially within the near field of the antenna, receive substantial and usable radio signals, but small enough so that radiation at distances beyond the roadway is negligible, so as not to interfere with broadcast reception beyond the highway.

1 Claim, 4 Drawing Figures

ENTERTAINMENT SYSTEM AND METHOD

The present invention is directed to a system and method for providing entertainment and/or information to vehicles travelling along a roadway.

Most automobiles today are provided with AM radios, and most drivers find it pleasant, and helpful to good driving, to listen to the radio while on long trips. On such trips, however, the use of the radio often becomes difficult and frustrating since the good reception areas of each station are rapidly passed through and the search for new stations in unfamiliar areas can be annoying and distracting.

According to the present invention, a system is provided wherein a driver can tune his radio to a single station while on a specific long distance road and receive high quality and continuous radio reception on that station for the duration of his trip on the road. The system is particularly suitable for a turnpike or other toll roads, and in such a case the operating authority of the road could use the system to communicate with drivers about road conditions, emergencies, etc., and additionally might be provided with an additional source of income. Most importantly, the system of the present invention accomplishes the above without permitting the radiation of enough electromagnetic energy to cause interference at radio receivers away from the road.

It is therefore an object of the invention to provide a system and method for providing high quality radio signals on a single frequency to vehicles travelling along a roadway and to provide such signals with approximately equal strength along the entire length of the roadway or a desired portion thereof.

It is a further object of the invention to ensure that the above-mentioned radio signals do not interfere with ordinary broadcast radio reception away from the road.

The above objects are accomplished by providing an antenna comprised of at least one conductor which is strung lengthwise along the roadway and preferably in the divider strip thereof at about the height of the average automobile antenna. The conductor or conductors are suitably terminated and are excited by a transmitter means with a modulated radio frequency signal in the 500 to 1500 Khz broadcast band in a manner such that each vertical slice through the conductors is effective as an electric multipole.

The vehicles travel well within the near field of the antenna (i.e. well within the distance of a wavelength from the antenna, which corresponds to a range of 597 to 1790 feet for the broadcast band), and hence receive near field radiation. The magnitude of the excitation signal is arranged to be large enough so that the vehicles, which are in the near field, receive high amplitude radio signals, but small enough so that the signals received away from the roadway are negligible.

Figure 2:
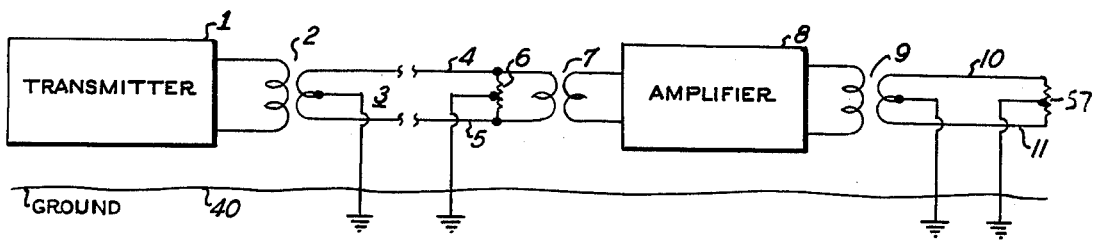
Figure 3:
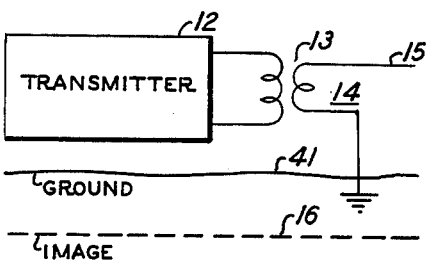
Figure 4:
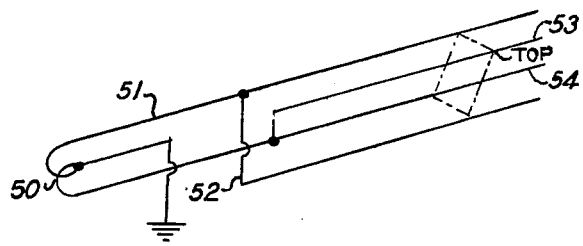

The invention will be better understood by referring to the accompanying drawings, in which:

FIG. 1 is a diagrammatic illustration showing an embodiment of the antenna of the system of the invention strung along a roadway, FIG. 2 is an electrical diagram of an embodiment of the system of the invention, FIG. 3 is an electrical diagram of a further embodiment of the system of the invention, and FIG. 4 is a diagram of a quadripole antenna which may be used in an embodiment of the invention.

FIG. 1 shows a road comprised of roadways 21 and 23 separated by divider 22. Vehicle 55 travelling from left to right in the Figure and having receiving antenna 29 is also shown. Conductors 24 and 25 are strung lengthwise along the divider and may be supported by any conventional mounting means known to those skilled in the art, such as for instance posts 26, 27 and 28. Conductors 24 and 25 are mounted vertically one above the other, are separated by a small fraction of a wavelength, and preferably are located at about the height of the average automobile antenna.

FIG. 2 is an electrical diagram of an embodiment of the invention which utilizes a dipole antenna situated over non-conducting ground. In FIG. 2 the non-conducting ground is represented at 40 and conductors 4 and 5 are the same as conductors 24 and 25 in FIG. 1. Transmitter 1 may be a conventional AM broadcast band transmitter, the details of which are known to those skilled in the art, and the output thereof is coupled to lines 4 and 5 in balanced fashion through transformer 2 having center tapped secondary 3.

At the end of the road or at a point where the signals on lines 4 and 5 have attenuated to the point where amplification is necessary, the lines are terminated by resistor 6 whose resistance equals the characteristic impedance of lines 4 and 5, and which may be, but need not necessarily be, center tapped to ground as shown. If the road does not end at this point then resistor 6 may be followed by a transformer 7 for coupling into an amplifier 8 whose output is coupled through transformer 9 to two more lines 10 and 11 to carry the signal further on. At the end of the signal path the lines are terminated by resistor 57.

Each vertical slice through conductors 4 and 5 constitutes an electric dipole. As is well known, the vertical electric field in the center plane of the dipole, a distance R therefrom, is given by the formula $$E \approx \sqrt{\left(\frac{1}{R^3} - \frac{1}{R}\right)^2 + \left(\frac{1}{R^2}\right)^2}$$

and it can be shown by integrating a travelling wave along a linear extent that essentially the same formula holds and the field strength does not increase with line length.

The above formula indicates that at distances substantially shorter than a wavelength from the antenna (that is substantially within the near field of the antenna) the $1/R^3$ term dominates and thus for small distances from the antenna the field falls off at a rate essentially proportional to the inverse cube of the distance. The antenna excitation signal is thus arranged to be large enough so that the vehicles on the roadway, which are substantially closer than a wavelength away from the antenna, receive high quality radio signals, but small enough so that the signals a short distance away from the roadway are negligible. Hence a system is provided which provides suitable radio reception for the vehicles along the length of the highway, but which does not interfere with broadcast reception beyond the highway. Further, the present invention takes advantage of the fact that the broadcast band frequency range of 550 to 1650 Khz, to which the vehicle radios are responsive, is appropriate for producing a usably large near field region.

FIG. 3 shows an electrical diagram of an embodiment of the invention which can be used over a conducting ground, which is represented as 41. In this embodiment transmitter 12 drives a transformer 13 which has a secondary 14, one side of which is grounded and the other side of which is connected to antenna line 15 running a fixed distance above the conducting ground. As is well known this arrangement results in an image line 16 as far below the surface as 15 is above it and the arrangement is electrically equivalent to that of FIG. 2.

FIG. 4 shows a quadripole antenna which may be used instead of the dipole shown in FIGS. 1 and 2. One side of the output of transformer secondary 50 (which secondary is grounded at center-tap) is fed to conductors 51 and 52 while the other side of the secondary is fed to conductors 53 and 54. The arrangement thus formed may be viewed as two pairs of dipoles 53, 52 and 54, 51 or alternately as two pairs of dipoles 53, 51 and 54, 52.

Further, while I have described an illustrative embodiment of my invention, I wish it to be understood that I do not intend to cover all modifications thereof which would be apparent to one skilled in the art and which come within the spirit and scope of my invention.

What is claimed is:

1. A system for providing entertainment and/or information to automobile vehicles having radio receivers and receiving aerials, travelling along a roadway, comprising, an antenna comprised of two parallel conductors strung adjacent to said roadway and parallel to the direction thereof, transmitter means for exciting said two conductors with a modulated radio frequency signal within 550 to 1650 Khz broadcast band so that each vertical slice through said antenna is effective as a dipole, said transmitter means being adjusted to excite said antenna weakly enough so that the radiated signal is negligible beyond short distances from said roadway so as not to interfere with ordinary broadcast reception, but strongly enough so that said vehicles, which are substantially closer than a wavelength's distance from said antenna, and within the near field region thereof, receive useful signals, said conductors being vertically spaced from each other by a small fraction of a wavelength, said roadway being part of a road which has a divider for separating said roadway and another roadway, said roadways accomodating travel in opposite directions, and said antenna being along said divider at the height of an average automobile vehicle aerial.

* * * * *